(12) United States Patent
Greil et al.

(10) Patent No.: US 6,783,866 B1
(45) Date of Patent: Aug. 31, 2004

(54) POLYMERCERAMIC MATERIALS WITH THERMAL EXPANSION CHARACTERISTICS SIMILAR TO THOSE OF METALS

(75) Inventors: Peter Greil, Weisendorf (DE); Andreas Basteck, Lörrach (DE); Steffen Walter, Herzogenaurad (DE)

(73) Assignee: Rauschert GmbH, Oberbetingen (DE)

( * ) Notice: Subject to any disclaimer, the term of this patent is extended or adjusted under 35 U.S.C. 154(b) by 0 days.

(21) Appl. No.: 10/049,063

(22) PCT Filed: Aug. 5, 2000

(86) PCT No.: PCT/EP00/07614

§ 371 (c)(1),
(2), (4) Date: Jul. 5, 2002

(87) PCT Pub. No.: WO01/10791

PCT Pub. Date: Feb. 15, 2001

(30) Foreign Application Priority Data

Aug. 10, 1999 (DE) .......................................... 199 37 322

(51) Int. Cl.[7] .......................... B32B 15/08; B32B 15/16; B32B 18/00; B05D 3/02; C04B 35/64
(52) U.S. Cl. ....................... 428/626; 428/332; 428/409; 428/446; 428/450; 428/698; 428/699; 428/702; 427/226; 264/345; 264/672; 264/673
(58) Field of Search ................................. 524/858, 860; 528/10, 12; 428/409, 446–448, 450, 625, 626, 411.1, 332, 688, 698; 427/226, 227; 264/671, 672, 673, 345

(56) References Cited

U.S. PATENT DOCUMENTS 5,635,250 A * 6/1997 Blum et al. .................. 427/387

6,051,642 A * 4/2000 Tkaczyk et al. ............ 524/444

FOREIGN PATENT DOCUMENTS

| DE | 3616378  | 11/1987 |
|----|----------|---------|
| DE | 4120835  | 1/1993  |
| DE | 4428465  | 2/1996  |
| DE | 19523655 | 1/1997  |
| DE | 19645634 | 5/1998  |
| DE | 19814697 | 10/1999 |
| DE | 19937322 | 6/2001  |

OTHER PUBLICATIONS

H. Schmidt and R.F. Singer, Neue Werkstoffkonzepte, pp. 55–61.

A. Bellosi, "Properties of Novel Polymer Derived Ceramic Composites", Fourth Euro–Ceramics, vol. 4, pp. 101–108.

* cited by examiner

*Primary Examiner*—Philip Tucker
*Assistant Examiner*—Michael J. Feely
(74) *Attorney, Agent, or Firm*—Burns, Doane, Swecker & Mathis, L.L.P.

(57) ABSTRACT

The invention relates to polymer ceramic composite materials with a virtually zero shrinkage compared to the original model after concluding partial pyrolysis and with a comparable thermal expansion behavior (preferably in an application range of 400° C. or less) to metal construction materials, in particular gray cast iron or steel, which are obtainable by methods described below; corresponding composite constructions and molded parts; and methods for producing and using these materials, composite constructions and molded parts. The polymer ceramic composite materials can for instance be used instead of or in contact with steel or gray cast iron temperature-proof molded parts, predominantly in mechanical engineering, without postmachining after the creative forming.

14 Claims, 3 Drawing Sheets

POLYMERCERAMIC MATERIALS WITH THERMAL EXPANSION CHARACTERISTICS SIMILAR TO THOSE OF METALS

SUMMARY OF THE INVENTION

The invention relates to polymer ceramic composite materials with a virtually zero shrinkage compared to the original model after concluding partial pyrolysis and with a comparable thermal expansion behavior (preferably in an application range of 400° C. or less) to metal construction materials, in particular gray cast iron or steel, which are obtainable by methods described below; corresponding composite constructions and molded parts; and methods for producing and using these materials, composite constructions and molded parts. The polymer ceramic composite materials can for instance be used instead of or in contact with steel or gray cast iron as temperature-proof molded parts, predominantly in mechanical engineering, without postmachining after the creative forming.

BACKGROUND OF THE INVENTION

Ceramic materials, because of their high wear resistance and good temperature resistance as well as corrosion resistance, are increasingly used as construction material for functional elements subjected to thermal and mechanical stress in machines, apparatuses and appliances. However, the demands in terms of the geometrical precision of the functional elements can be met by ceramic materials only through complicated postmachining or a complicated shape-finding process (an iterative process), which makes it more difficult to achieve economical production, especially of component parts that are complicated in shape or that must be made with high precision. Moreover, the mechanical postmachining can for instance damage otherwise closed surfaces and thus lead to reduced stability. Furthermore, the difference in thermal expansion between ceramic (silicon nitride and silicon carbide, for instance, 3 to $4.5 \times 10^{-6} K^{-1}$, aluminum oxide and zirconium oxide, approximately 8 to $9 \times 10^{-6} K^{-1}$), and gray cast iron (9 to $10 \times 10^{-6} K^{-1}$) or steel (10 to $13 \times 10^{-6} K^{-1}$) (temperature range from room temperature to approximately 500° C.) upon temperature stress leads to different expansions between metal and ceramic, which in the combination of ceramic and metal parts causes a mechanical overload on the ceramic part as well as inherent stresses at seams and connecting faces as well as increasing gap sizes at sealing faces and thus limit the functional capability of the applicable machine or system, for instance.

Plastic products do have the advantage of economical production, but these parts have low dimensional accuracy, as well as poor temperature resistance in long-term use at less than 150° C. and rarely up to less than 200° C.

A higher temperature resistance is offered by so-called polymer ceramics, in whose production a polymer is decomposed partially or completely by pyrolysis and is thus converted entirely or partly into an inorganic composite material, which however depending on the temperature treatment still contains organic components. In addition, the polymer ceramic can contain fillers, such as ceramic powders.

The reaction of ceramic fillers, which on their surface have reactive groups, such as OH groups, with cross-linkable functional groups in a polymer matrix (isocyanates, siliconates and their salts and esters) between 100° C. and 180° C. has been described in German Patent Disclosure 412 08 35. Pourable compositions were used press-shaping polymer ceramics. In an expansion of the principle of curing by surface condensation reactions, German Patent Disclosure DE 442 84 65 describes the production of polymer ceramic from an organosilicon matrix between 200 and 800° C. The development of primary chemical bonds between the ceramic filler and the polymer is said in this reference to be a precondition for the development of a shape- and temperature-stable network in the heating process that makes it possible to achieve relatively slight volumetric changes, with less than 1% linear shrinkage. The shaping of such polysiloxane-filler compositions with surface-active groups on the ceramic powder is made possible by pressing as well as alternatively, as described in German Patent Disclosure DE 195 23 655, by casting, injection molding and extrusion. To increase the mechanical strength, fiber fillers, which on their surface have amino groups, for instance, can additionally be incorporated (German Patent Disclosure DE 196 45 634). German Patent Disclosure DE 198 14 697 describes piezoelectric actuators, in whose production ceramic and metal components or precursors thereof are extruded simultaneously. Neither the desired shape constancy compared with the original model nor the metal-like coefficients of expansion of the present invention, nor the composite materials of the present invention, in particular individual parts comprising polymer ceramic components and a metal part in combination, are either obvious from or even sought in the references cited.

Many applications exist for temperature-proof materials and components, for instance in automotive engineering (connecting parts, housings or brake parts, which come into contact with an elevated ambient temperature, and exhaust pipes or components thereof), in machine tool construction, in robotics (for guiding and sliding elements, for instance), in the field of metallurgy, or in the field of pressure- and vacuum-pump technology, or other fields. Another especially important aspect is to minimize costs and, for the sake of reducing the risk of corrosion and/or for lightweight construction, to use substitute materials for metals, especially gray cast iron and steel.

In particular, there is a lack of materials that even at higher temperatures have a heat expansion (or coefficient of thermal expansion=CTE), that is comparable and in particular equal to that of steel or gray cast iron, and that moreover can withstand high temperatures in the temperature ranges of interest, even under relatively long-term action. It should be feasible to produce such materials, and parts and components made from them, by the creative forming, such as press-forming or in particular casting, injection molding, or extrusion.

One important goal is to enable the production of (in particular large-sized) molded parts or composite constructions made up of relatively large parts with high dimensional stability by the creative forming, without postmachining, and thus to reduce or eliminate the risks to components that are due to their brittleness, possible material damage from shaping and other posttreatment methods that remove material but are necessary to adapt to required shapes and dimensions with high dimensional stability, especially in the case of polymer ceramic components. For this purpose, the pyrolysis following the shaping and performed at a temperature that makes practically zero shrinkage in the creative forming possible, is a precondition.

In particular, there is an urgent need to be able to produce molded parts, in particular relatively large molded parts, or composite constructions made up of relatively large components (such as molded parts) with high dimensional stability that have a thermal expansion in the range of the metal construction materials primarily used, in particular in the range of steel or gray cast iron, as well as adequate strength, temperature resistance above all at elevated temperatures, and corrosion resistance.

It is the object of the invention to make polymer ceramic materials available whose thermal expansion in the finished product, unlike known polymer ceramic materials, is made comparable to the thermal expansion of steel and gray cast iron, and at the same time in the production by the creative forming to achieve a high dimensional stability, so that in particular molded parts or composite constructions with complicated geometry or relatively large dimensions, for instance with a minimum outer diameter of more than 20 mm and preferably more than 50 mm, can be produced. These and the other stated objects are attained in a surprising way by means of the polymer ceramics, composite constructions including polymer ceramic components, and polymer ceramic molded parts described in the present disclosure. The prior art makes no reference whatever to ways of attaining this object, and even the object itself is not taken into consideration there.

GENERAL DESCRIPTION OF THE INVENTION

A few or several or in particular all of the objects stated above are met by a polymer ceramic, or in a synonym polymer ceramic composite material including (i) a preceramic polymer (ceramic binder, hereinafter called a polymer or defined more precisely, and this term can also encompass mixtures of polymers), (ii) its pyrolysis-dictated products of decomposition, and (iii) requisite fillers (ceramic powder, ceramic filler), and in particular by a polymer ceramic material which is characterized by a thermal expansion behavior which is comparable to and in particular is the same as that of a metal (this term in the broad sense includes alloys), in particular steel or gray cast iron, and is preferably obtainable by a heat treatment, under theoretically or preferably empirically ascertained conditions (with respect to duration and above all temperature and temperature course), which makes it possible for the material, or a shaped body produced from it, after the concluding heat treatment, to have the same linear dimensions as the original model (zero shrinkage in the creative forming), within a tolerance of less than 0.1% and preferably less than 0.05%.

In particular, the invention relates to a molded part which comprises such a material and/or to a composite construction which includes such a material.

The molded parts, composite constructions or materials as well as methods according to the invention make it possible in particular for the requisite dimensional accuracy (essentially zero shrinkage compared to the mold) of the polymer ceramic components to be attained in the creative forming directly (by suitable heat treatment and/or a suitable composition of the polymer ceramic material). This makes enormous cost reductions possible, by a factor of 2 or more, since there is no requirement for postmachining. The attendant adaptation of the thermal expansion behavior to that of metals, especially steel or gray cast iron, makes usage for instance in the fields named at the outset possible. In a surprising way, the urgent practical requirements are appropriately met. In particular, the polymer ceramic materials of the invention also have the advantage of a certain residual elasticity, which for instance is capable of cushioning and reducing surface stresses induced from outside and/or can reduce losses from friction in the combination with other parts.

DETAILED DESCRIPTION OF THE INVENTION

Figure 1:
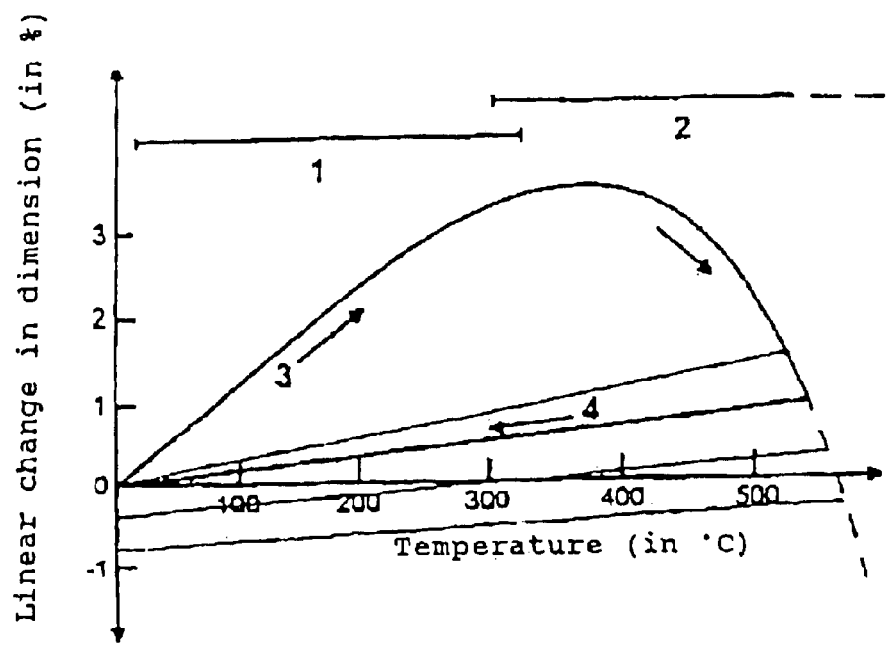
FIG. 1 shows the dimensional changes in partial pyrolysis of polymer ceramic compositions. (1)=thermal expansion, (2)=pyrolysis shrinkage, (3)=polymer, (4)=ceramic.

The invention relates to a polymer ceramic composite material or in particular to a molded part comprising a polymer ceramic material or composite construction, including at least one component of a polymer ceramic material (such as a molded part of the invention), wherein the fundamental polymer ceramic material has a thermal expansion behavior comparable to metal construction materials and zero shrinkage compared to the original model after concluding partial pyrolysis, obtainable by a method which includes that at least one polymer material and one or more ceramic fillers (and further additives as needed) are mixed together, then subjected to cross-linking—in the case of the molded part, producing a corresponding green body and in the case of a composite construction directly in the presence of further components, if the composite construction is to be produced by the creative forming or from a polymer ceramic material of known composition (alternatively, it can also be produced by subsequently combining other components with one or more molded parts of the invention)—and finally, the resultant material, the resultant precursor stage of the composite construction or the resultant green body of the molded part is subjected to a partial pyrolysis, and the weight ratios of the components used and the type of heat treatment are selected on the basis of theoretical or (preferably) empirically ascertained values, such that the resultant polymer ceramic composite material, the resultant molded part, or the resultant composite construction—all of them together referred to hereinafter as "product"—has the thermal expansion behavior comparable to that of a metal, and after the partial pyrolysis has the same linear dimensions as the original model, within a tolerance of equal to or less than 0.1%.

The invention preferably relates to a polymer ceramic composite material, a molded part, or a composite construction in accordance with the preceding paragraph, obtainable by partial pyrolysis of a mixture including a ceramic filler in a proportion of 10 to 80 volume percent and a polymer in a proportion of 20 to 90 volume percent, wherein the partial pyrolysis is selected in the range between 200 and 800° C., preferably in the range from 500 to 750° C., such that compared to the original model, a shrinkage of 0.1% or less, preferably 0.05% or less, is attained.

A polymer ceramic composite material, molded part or composite construction of one of the two above paragraphs, which in addition to a ceramic filler and a polymer includes still other additives up to 10 volume percent, is strongly preferred.

A polymer ceramic composite material, molded part or composite construction of one of the last three above paragraphs, characterized in that its thermal expansion is the same as that of steel or gray cast iron, is strongly preferred.

A polymer ceramic composite material, molded part or composite construction of one of the last four above paragraphs, characterized in that its thermal expansion in the range from −50° C. to 500° C. is the same as that of steel or gray cast iron, is strongly preferred.

A polymer ceramic composite material, molded part or composite construction of one of the last five above paragraphs, characterized in that its thermal expansion, in the range from room temperature to 400° C., is the same as that of steel or gray cast iron, is strongly preferred.

A polymer ceramic composite material, molded part or composite construction of one of the last six above paragraphs, characterized in that in its production, ceramic fillers with a particle size of from 1 to 50 μm are used, is strongly preferred.

The invention also relates to a composite construction, in particular a single part, comprising a polymer ceramic molded part of one of the last seven paragraphs, in a composite with metal parts.

A single part in accordance with the paragraph directly preceding this one, in which the metal parts are steel or gray cast iron parts, is preferred.

The invention also relates to a production method for a polymer ceramic composite material, a molded part, or a composite construction, in accordance with one of the last nine paragraphs, including as method steps that at least one polymer material and one or more ceramic fillers (and further additives as needed) are mixed together, then subjected to cross-linking—in the case of the molded part, producing a corresponding green body and in the case of a composite construction directly in the presence of further components (parts, above all comprising other materials), if the composite construction is to be produced by the creative forming or from a polymer ceramic material of known composition (alternatively, it can also be produced by subsequently combining other components with one or more molded parts of the invention)—and finally, the resultant material, the resultant precursor stage of the composite construction or the resultant green body of the molded part is subjected to a partial pyrolysis, and the weight ratios of the components used and the type of heat treatment are selected on the basis of theoretical or (preferably) empirically ascertained values, such that the resultant polymer ceramic composite material, the resultant molded part, or the resultant composite construction—all of them together referred to hereinafter as "product"—has the thermal expansion behavior comparable to that of a metal, and after the partial pyrolysis has the same linear dimensions as the original model, within a tolerance of equal to or less than 0.1%.

The invention relates in particular to a method in accordance with the paragraph directly preceding this one, wherein the weight ratios of the components used are selected such that the resultant product has a thermal expansion behavior comparable to that of steel or gray cast iron, and after the partial pyrolysis has the same linear dimensions as the original model, within a tolerance of equal to or less than 0.05%.

A method in accordance with the next-to-last paragraph is preferred wherein the weight ratios of the components used and the manner of the partial pyrolysis are selected on the basis of empirically ascertained values, characterized in that the empiric ascertainment includes the following steps:

(A) first, empirical ascertainment, for a material or molded part produced from a polymer or a polymer ceramic material or a component, produced from a polymer or a polymer ceramic material, of the composite construction, of the exact pyrolysis temperature for zero shrinkage compared to the original model in the creative forming, and ascertainment of the coefficient of thermal expansion of the material thus obtained;

(B) adaptation of the coefficient of expansion to that of steel or gray cast iron by admixing ceramic fillers (in which further variables should initially be kept constant); and (C) ensuing ascertainment of the exact pyrolysis temperature for zero shrinkage in the creative forming and simultaneous adjustment of a coefficient of thermal expansion in the range of that of the target metal, in which step (B), if the requisite pyrolysis temperature is between the raster points used, is repeated once again with fine tuning, and it may be necessary to repeat steps (B) and/or (C) again or even multiple times iteratively.

Also preferred is a method in accordance with paragraph 0032, wherein the weight ratios of the components used and the manner of the partial pyrolysis are selected on the basis of empirically ascertained values, characterized in that the empiric ascertainment includes the following steps:

(A*) pyrolysis of a polymer or a polymer ceramic material of known composition at various pyrolysis temperatures for ascertaining the coefficient of thermal expansion of the polymer ceramic material or polymer ceramic molded part obtainable in each case or of the obtainable component of the composite construction, and ascertainment of the shrinkage or expansion of the material thus obtained;

(B*) admixing ceramic fillers for adapting the coefficient of thermal expansion to that of steel or gray cast iron; and (C*) ascertaining the pyrolysis temperature with zero shrinkage; wherein, since in step (B*) only one raster is constructed, the requisite pyrolysis temperature for this can be between the raster steps, so that iteratively the range of the pyrolysis temperature and the suitable composition can be obtained by means of a single or multiple repetition of steps (B*) and/or (C*).

The invention relates to the use of a polymer ceramic material, a composite construction including it, or a molded part comprising it, as described above in the section headed "Detailed Description of the Invention", in machines, appliances or systems in which they come into contact with metal materials or parts, preferably in a temperature range from −50° C. to 400° C., and in particular from room temperature to 350° C., and above all from 25 to 300° C.

The general terms given above and below have the following meanings within the scope of the present disclosure, unless otherwise noted:

"Including" means that besides the components named still other components or additives can be present, preferably in the range from 10 volume percent (vol.-%) or less, and in particular 7 volume percent or less (which means the same as "containing at least"), or in methods, it means that still other method steps and/or materials are possible. Preferably, instead of "including", the word "containing" can be used.

Instead of the term "partial pyrolysis", above and below the term "heat treatment" or "pyrolysis" is also used. The heat treatment is preferably done in a controlled way, for instance by means of relatively slow heating rates and relatively slow cooling rates, for instance cooling rates in the range from 0.2 to 10° C. per minute, in order to prevent the occurrence of stresses in the resulting materials or molded parts. The heat treatment preferably takes place under conditions of exclusion of air and oxygen, particularly in an inert gas, such as argon.

"Theoretically or empirically ascertained" in conjunction with the heat treatment pertains to articles in the literature or in particular to variants of the mixing rule with empirical measurements, such as dilatometry (dependency of expansion on temperature and coefficient of expansion and comparable variables) as well as shrinkage. Preferred methods for theoretically or empirically ascertaining the parameters for the heat treatment, and in particular the maximum pyrolysis temperature, but also the holding time (which particularly in the range below 400° can be variable, while above this temperature it can be relatively constant) and/or the heating and cooling rate, are recited below.

The numerical indications of (weight percent or) volume percent given below always refer to the educts (before the heat treatment, which as a rule leads to the partial decomposition of the polymer used.

A thermal expansion behavior (or heat expansion behavior) comparable or in particular equal to a metal and in particular gray cast iron or steel is understood to mean in particular a corresponding coefficient of thermal expansion; that is, the corresponding coefficients of thermal expansion (CTE) are preferably in the range from 9 to $13 \times 10^{-6} K^{-1}$. This thermal expansion behavior occurs according to the invention preferably in the range from −50 to 500° C., and in particular from room temperature to 400° C.

The parameter of "a coefficient of thermal expansion comparable or in particular the same as a metal (or a metal construction material)" (or a corresponding thermal expansion behavior or heat (expansion) behavior) also makes it possible to distinguish in terms of substance from other polymer ceramic materials, components of composite constructions and molded parts, since this outcome has a corresponding structure and composition as a prerequisite. The term "comparable" means in particular that the coefficients of thermal expansion of the corresponding product are below the lower, or above the upper, coefficient of thermal expansion of the corresponding metal, such as steel or gray cast iron in particular, by up to and including 20%, in particular 10%, and preferably up to and including 3%. If the coefficient of thermal expansion is the "same", then it differs from that of the corresponding metal by 1% or less, and in particular 0.1% or less.

Although even if not especially stated, when ranges such as percentages or temperature ranges or the like are given with numerical values, the upper and lower limit values cited are also understood to be included.

A preceramic polymer is understood in particular to be a polymer in whose complete pyrolysis, a practically complete conversion into carbon or other inorganic substances (as would be the case for instance with polyesters, polyethers or epoxy resins) does not occur. Preferred examples are named below, without in any way limiting the scope of possible polymers.

Where a polymer is discussed above and below, unless otherwise indicated or apparent, this always means a preceramic polymer.

"Zero shrinkage" means a linear shrinkage of 0.1% or less, and above all of 0.05% or less.

The method according to the invention for producing the polymer ceramic materials and molded parts named at the outset is characterized in particular in that by way of the degree of conversion, determined by the heat treatment temperature, of the polymer into the polymer ceramic binding phase and in conjunction with the incorporation of ceramic fillers with thermal expansion adapted thereto, molded parts, components of composite constructions, or composite constructions are produced that in their thermal expansion behavior are largely comparable to or the same as that of metals, in particular steel or gray cast iron; that is, the corresponding coefficients of thermal expansion (CTE) are preferably in the range from 9 to $13 \times 10^{-6} K^{-1}$.

The term "composite construction" in the sense intended in the invention is understood in particular to mean a combination of one or more parts (components) of polymer ceramic material, which is combined with one or more parts (components) of other materials, in particular metal, and above all steel or gray cast iron. According to the invention, composite constructions can be produced either right away by incorporating their components ("components of the or of a composite construction"—in the case of the polymer ceramic components as a precursor, together with the part or parts of other materials, which together make up the "precursor stage of the composite construction") in the creative forming with heat treatment or alternatively by combining one or more molded parts comprising a polymer ceramic material of the invention with the other components (parts comprising other materials), in particular metal parts, or by any conceivable combination of these steps.

The polymer ceramic materials of the invention and molded parts made from them are especially well suited to use in combination with metal components (for instance, if the polymer ceramic parts are in contact with metal parts, in particular parts made of gray cast iron or steel, whether by material engagement—for instance adhesive bonding—or in particular positive engagement—for instance by incorporating molded parts in the creative forming or during or after the heat treatment—or nonpositive engagement—for instance by encasing, using pressing, clamping or the like), in temperature-stressed component groups such as in brakes, motors or other machines, appliances or systems. The products that then result are also covered by the composite constructions according to the invention.

The starting composition, preferably comprising a polymer, in particular a cross-linked organosilicon polymer, and as needed one or more ceramic fillers and if desired further additives, is subjected, in particular after the shaping and cross-linking, for instance at temperatures between 0 and 200° C., in particular between 100 and 200° C., to a controlled heat treatment in the temperature range between 200 and 800° C., preferably between 400 and 750° C., and in particular between 500 and 750° C., and above all in the temperature range between 500 and 680° C.; from the polymer, and in particular from a polysiloxane resin, an amorphous polymer ceramic binder phase is created between the filler particles. It is decisive here that the thermal expansion of the starting composition is compensated for precisely, by a partial pyrolysis of the polymer component, to such an extent that after the cooling and thermal contraction, the initial dimensions of original model part are preserved. The dimensional stability can be assured by simple monitoring of the heat treatment temperature within narrow limits (0.1% linearly or less); under constant production conditions, production variations of less than or equal to 0.05% can in particular be attained. FIG. 1 shows the dimensional changes that occur in the heat treatment. In particular, it is thus possible, using creative shaping methods that are usual in ceramics, such as pressing, casting, injection molding or extrusion, to create molded parts or (in the presence of other components comprising other materials, in particular metals) composite constructions according to the invention.

A preferred example of suitable polymers is organosilicon polymers, in particular easily processed polysiloxane resins, but also polysilane, polycarbosilane, polysilazane, polyborosilazane, or mixtures of them can be used. Where the terms polymer, polymer material, highly cross-linked organosilicon polymer, or the like are mentioned above and below, mixtures of a plurality of these components may also be involved. Taken together, these then result in what have been called the preferred volume percent proportions.

Figure 3:
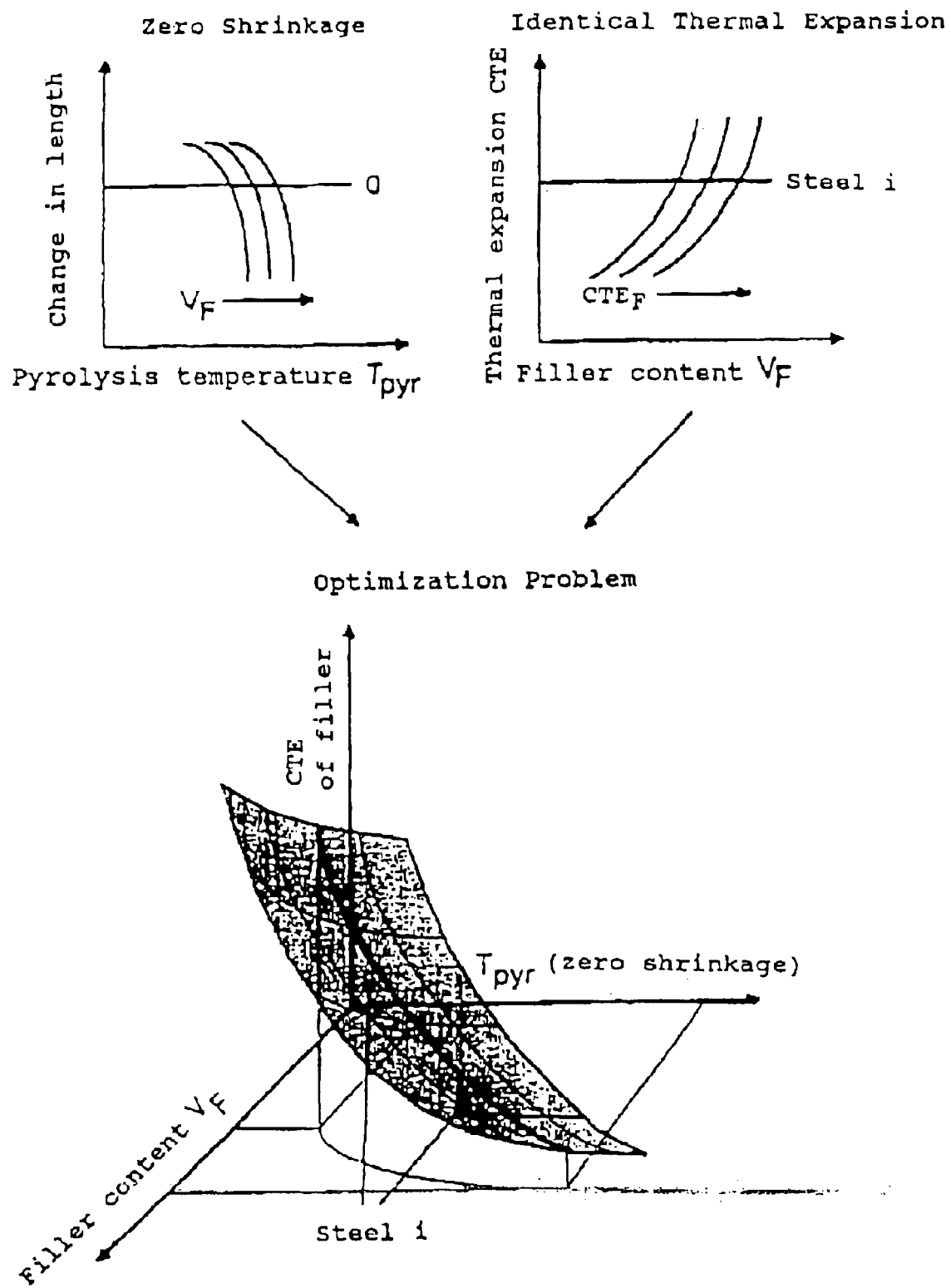
FIG. 3, for the sake of illustrating the methods described below, shows a three-dimensional matrix, on the basis of which the problem of optimization, that is, at the same time to achieve zero shrinkage and a thermal expansion comparable to that of metals, can be solved, for instance empirically.
Figure 4:
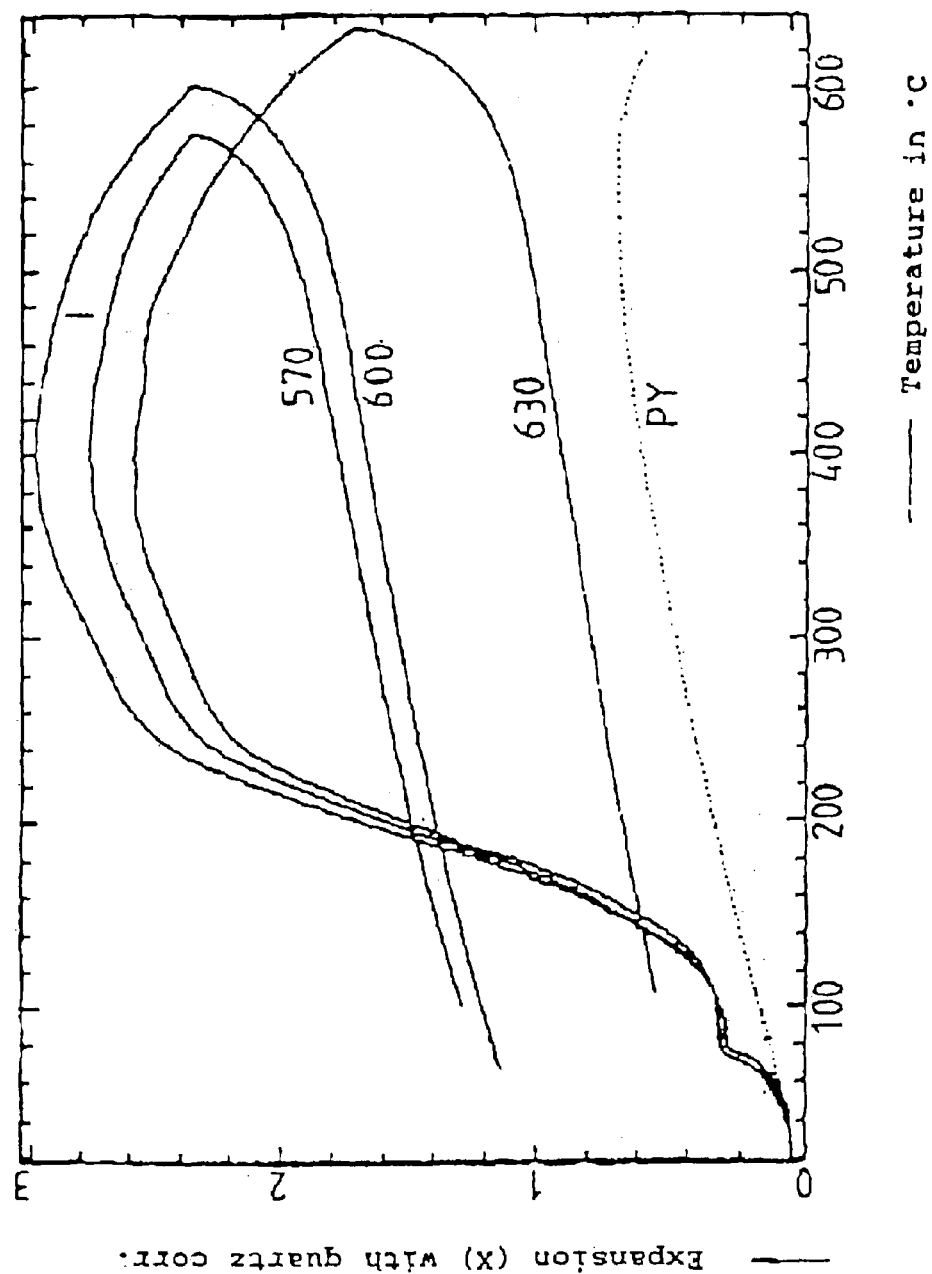
FIG. 4 shows the expansion and subsequent shrinkage of a polymer ceramic material (described in further detail in exemplary embodiment 2) at various pyrolysis temperatures.

By incorporating ceramic fillers in volumetric contents of 10 to 80 volume percent, preferably for producing molded parts or composite constructions that can be obtained by pressing, casting, injection molding or also extrusion methods, from about 20 to 80 volume percent, in particular from 30 to 80 volume percent, preferably from 30 to 70 percent, primarily from 30 to 60 volume percent, and above all between 30 and 50 volume percent, which have a thermal expansion adapted to the thermal expansion of the polymer ceramic binder phase, it is possible to successfully produce molded parts or composite constructions whose thermal expansion behavior, between room temperature and 500° C., is largely comparable to and particular is the same as that of steel (10 to $13 \times 10^{-6} K^{-1}$) or gray cast iron (9 to $11 \times 10^{-6} K^{-1}$). First, the pyrolysis temperature with zero shrinkage for a given polymer is for instance ascertained. Then the coefficient of thermal expansion is ascertained, and finally is compensated for as needed by suitable fillers. The incorporation of ceramic fillers then makes it possible to achieve both dimensional stability and a further adapted thermal expansion simultaneously. Proceeding in reverse order (first ascertaining the composition and the pyrolysis temperature and then, if necessary, iteratively, varying these parameters until a zero shrinkage is achieved) is also possible. Preferred methods are described below. FIG. 3 shows how this optimization problem is solved by means of a three-dimensional matrix.

Preferred ceramic fillers are listed in Table 1, but still other, nonreactive ceramic compounds with correspondingly high thermal expansion can also be used.

TABLE 1

| Ceramic | CTE ($\times 10^{-6} K^{-1}$) |
| --- | --- |
| $Al_2O_3$ | 8.3 |
| MgO | 14 |
| $MgSiO_3$ | 11 |
| $ZrO_2$ (CSZ)* | 13.5 |
| $ZrO_2$ (PSZ)* | 10.5 |
| SiC | 4.5 |
| $Cr_3C_2$ | 9.8 |
| $Fe_2TiO_5$ | 11.9 |
| $MgFe_3O_4$ | 12.3 |
| $KAlSi_2O_6$ | >15 |
| Phosphate glasses | 18 |
| $CeO_2$ | 13 |
| $CaTiO_3$ | 9–14 |
| $SiO_2$** | 14 |
| C (Graphite) | 0.1–19.4 |
| $CaF_2$ | 25 |
| $Si_3N_4$ | 3.0 |
| $TiO_2$ | 9.4 |
| $FeSiO_4$ | 23.6 |
| $NaAlSiO_4$ | 15.2 |
| $BaSi_2O_3$ | 17.2 |

CSZ: Cubic Stabilized Zirconia:
PSZ: Partially Stabilized Zirconia:
**Sikron SH 300 (Quartzworks, Frechen)

Silicates, such as sodium, magnesium, calcium or lithium aluminum silicates, or calcium fluoride can also be used as fillers, especially if the coefficient of thermal expansion of the polymer ceramic, beyond a certain pyrolysis temperature, is greater than that of the corresponding metal, above all steel or gray cast iron.

Where a ceramic filler material, ceramic filler, filler or the like (all with the same meaning) are mentioned above and below, mixtures of a plurality of these components may also be involved. Taken together, they then result in the volume percent proportions stated to be preferred.

Besides the polymer and the filler, still other additives may be present, preferably in the range from below 10 volume percent, in particular below 7 volume percent, which can increase the strength, such as glass frits, or in particular waxlike substances, such as wax, and/or catalysts, such as aluminum acetylacetonate.

Products according to the invention are preferred in which the polymers and/or the additives in the pyrolysis do not create any chemical (and in particular covalent) bonds with the fillers.

The preferred method according to the invention is also fundamentally distinguished here from polymer pyrolysis methods with reactive fillers, which react either completely at temperatures above 800° C. (German Patent 392 60 77) or at lower temperatures via reactive groups on the surface (German Patent Disclosure DE 442 84 65) with the polymer phase, forming primary chemical bonds. The ceramic fillers can be replaced entirely or in part by a so-called inherent filler, which can be produced by heat treatment of the preceramic polymer and ensuing processing into a powder. Inherent fillers offer the advantage that the thermal expansion can be adjusted in a targeted way by means of the pyrolysis temperature.

Products according to the invention that are particularly preferred are produced without the addition of float glass frits, Products according to the invention are also preferred in which the polymer component does not include any phenylmethylsiloxane resins. Products according to the invention are also preferred in which the polymer component does not include any siloxanes with unsaturated groups. Products according to the invention are also preferred in which the polymer component does not include any polyester, epoxy resins, or polyether. Products according to the invention are also preferred in whose production no solvents are used, except in the case of the use of casting, injection molding and extrusion methods, where that is possible. Kaolin is preferably precluded as a filler material.

As a function of the flow properties of the polymer component used (solid or liquid at room temperature) and as a function of the filler content (that is, ceramic filler content), the shaping of the polymer/filler compositions is done using shaping methods that are usual in ceramics, such as pressing, casting or injection molding in closed molding tools, or extrusion. Next, under pressure at preferred temperatures of 0 to 200° C., in particular between 100 and 200° C., the cross-linking of the polymer binder phase is done, preferably in inert gas. After the unmolding, the molded part has high green strength and can be machined if desired by cutting methods.

The porosity that is typical for polymer ceramic materials, which in particular in the temperature range from 200° C. to 800° C. reaches its maximum as a result of decomposition of the polymer phase and removal of gaseous organic cleavage products, is indeed preserved in the interior of the molded part, but at the surface of the molded part can be largely converted or decomposed into a closed pour structure.

A preferred embodiment of the invention is the use of carbon-containing parting or unmolding coatings on the mold surfaces, which after the unmolding and heat treatment remain on the surface of the product, in particular the molded part, and result in sealing. This makes it possible for instance also to use the products, in particular molded parts, for applications in which pressure or vacuum is generated (as in pumps).

The polymer ceramic composite material according to the invention is especially well suited to dimensionally precise production methods and composite constructions or molded parts with close tolerances, as well as a thermal expansion comparable to the metal substrate material (in particular steel or gray cast iron), which are of particular significance for applications as temperature-stressed function elements in the most various component groups, such as machines, motors or systems.

Below, two alternatives for the theoretical or empirical ascertainment will be described in detail in terms of the way in which the suitable primary parameters (pyrolysis temperature and composition for obtaining low shrinkage of 0.1% or less, preferably 0.05% or less, and a coefficient of thermal expansion comparable to or preferably the same as that of gray cast iron or steel) for the products of the invention, in particular the polymer ceramic materials and molded parts, can be ascertained in a targeted way in order to arrive at products according to the invention, in particular polymer ceramic materials (see also FIG. 3):

Alternative (I) (preferred)

Step (A): First, for a material or a corresponding molded part produced from a polymer or a polymer ceramic material of known composition, or for a component produced from that material in a composite construction, the exact pyrolysis temperature for zero shrinkage compared to the original model in the creative forming is empirically ascertained, and the coefficient of thermal expansion (CTE) of the material with zero shrinkage is ascertained.

Step B: By admixing ceramic fillers (in which further variables, such as substance, fill level and binder layer of the filler should be taken into account or in other words should initially be kept constant), the coefficient of expansion is adapted to that of steel or gray cast iron.

Figure 2:
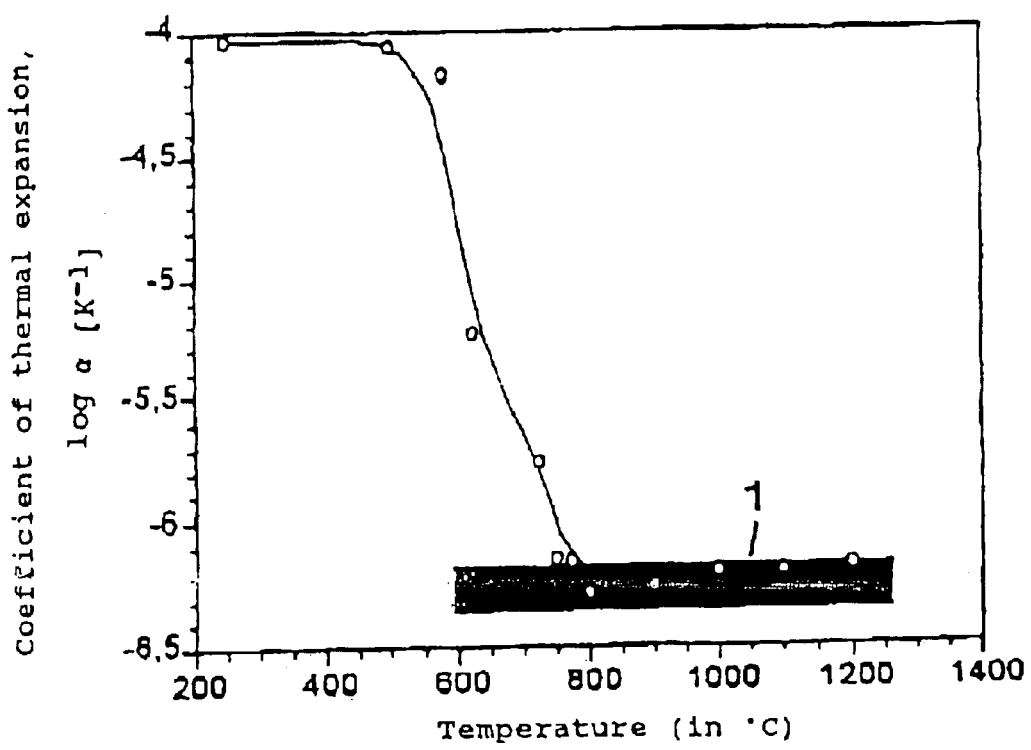
FIG. 2 shows as an example the coefficient of expansion of polymethylsiloxane as a function of the pyrolysis temperature in argon.

Explanation: In accordance with the example in FIG. 2 and FIG. 3, the coefficient of expansion varies with an increasing pyrolysis temperature. In polysiloxane, for instance, the CTE, up to a pyrolysis temperature of 400° C., is approximately $90 \times 10^{-6} K^{-1}$, while in pyrolysis above 800° C. it is below $1 \times 10^{-6} K^{-1}$. This means that with an increasing pyrolysis temperature, between 200 and 800° C., the CTE becomes smaller and smaller. However, at 650° C., it is not yet small enough to have the same coefficient of expansion (CTE) as steel or gray cast iron. Step (B) must therefore be completed.

A theoretical rough estimate (without taking the particle size into account) can be done in accordance with Turner and Kerner: From the modelling of the thermal expansion behavior of the filled polymer compositions, using Turner's formulations, $$\langle \alpha \rangle = \frac{\frac{\alpha_1 K_1 F_1}{\rho_1} + \frac{\alpha_2 K_2 F_2}{\rho_2}}{\frac{K_1 F_1}{\rho_1} + \frac{K_2 F_2}{\rho_2}}$$

and taking shear effects at the phase boundaries into account in accordance with Kerner, $$\langle \alpha \rangle = \alpha_1 + V_2(\alpha_2 - \alpha_1) \frac{K_1(3K_2 + 4G_1)^2 + (K_2 - K_1)(16G_1^2 + 12G_1 K_2)}{(4G_1 + 3K_2)[4V_2 G_1(K_2 - K_1) + 3K_1 K_2 + 4G_1 K_1]}$$

it is possible, with knowledge of the temperature-dependent coefficient of thermal expansion $\alpha_1$, accessible in table form for instance (such as in the Handbook of Chemistry and Physics) for phases i (1: polymer; 2: filler), the compression and shear modules $K_i$ and $G_i$, and the mass and volumetric proportions $F_i$ and $V_i$ as well as the densities $r_i$, to derive expected values for the mean expansion of the composite materials.

Next, or independently of such an estimation, an empirical ascertainment is done by means of investigating a matrix of various fillers with various coefficients of expansion, for instance in accordance with the following example (using cylindrical bodies as a pattern, for instance):

An example of a matrix for ascertaining mixture ratios and pyrolysis temperatures in order to achieve certain coefficients of thermal expansion sought:

| Filler Concentration (Weight %) | Polymer 1 CTE 1 | Polymer 1 CTE 2 | Polymer 1 CTE 3 | Polymer 1 CTE 4 |
|---|---|---|---|---|
| 0 | | | | |
| 30 | | | | |
| 50 | | | | |
| 65 | | | | |
| 70 | | | | |
| 75 | | | | |
| 80 | | | | |
| 83 | | | | |
| 85 | | | | |
| 90 | | | | |

CTE 1 = coefficient of thermal expansion in pyrolysis at 500° C., for instance
CTE 2 = coefficient of thermal expansion in pyrolysis at 550° C., for instance
CTE 3 = coefficient of thermal expansion in pyrolysis at 600° C., for instance
CTE 4 = coefficient of thermal expansion in pyrolysis at 650° C., for instance
The CTE values are expressed in $10^{-6} K^{-1}$ In this way, the range is discovered in which the polymer ceramic mixtures each have CTE values in the range of gray cast iron or steel, for instance.

Step (C): Next, the exact pyrolysis temperature for zero shrinkage in the creative forming and simultaneously the establishment of a coefficient of thermal expansion in the range of that of the target metal, such as steel or gray cast iron, are ascertained: Since in the first step (B) only a raster is constructed, the pyrolysis temperature required for this may be located between the raster points, so that under some circumstances step (B) must be repeated yet again with fine tuning (for instance by means of a narrower temperature range for the pyrolysis, for instance at a pyrolysis temperatures of 510, 530 and 540° C. and filler quantities of 50, 55 and 65%, for example). Under some circumstances it may be necessary for this process (steps (B) and/or (C)) to be repeated again or even multiple times iteratively.

Alternative (II)

Step (A*): First, by pyrolysis of a polymer or of a polymer ceramic material of known composition (material or molded part or components of a composite construction that are made from the material), at various pyrolysis temperatures, the linear coefficients of thermal expansion (CTE) of the various products obtainable, in particular the fundamental polymer ceramic materials or the molded parts comprising them are ascertained and at the same time the shrinkage or expansion is ascertained.

Step (B*): By admixing ceramic fillers (in which further variables, such as substance, fill level, particle size and binder layer of the filler should be taken into account, or in other words initially kept constant), the coefficient of expansion is adapted to that of steel or gray cast iron. Here a matrix analogous to that shown above for step (B) can be used, and/or a prediction of suitable ranges can be ascertained in accordance with the methods named there for the rough estimate. In this way the range is discovered in which the polymer ceramic mixtures each have CTE values in the range for instance of gray cast iron or steel.

Step (C*): Next, the exact pyrolysis temperature for zero shrinkage, compared to the shape obtained after the thermal pretreatment and the attendant shaping in the case of molded parts or components of composite constructions (that is, compared to the shape in the creative forming), is ascertained. Since in the first step (B*) only a raster is constructed, the pyrolysis temperature required for this may be located between the raster points, so that under some circumstances step (B*) must be repeated yet again with fine tuning (for instance by means of a narrower temperature range for the pyrolysis, for instance at a pyrolysis temperatures of 510, 530 and 540° C. and filler quantities of 50, 55 and 65%, for example). Under some circumstances it may be necessary for this process (steps B* and/or C*) to be repeated again or even multiple times iteratively.

As soon as the above-named parameters, in particular the filler content, polymer content, temperature of the thermal cross-linking, and (partial) pyrolysis temperature, optionally the content of further additives, and also other parameters such as the size of the particles of the filler and the like are known, it is possible under now-constant conditions, in a simple way, to execute production even in a relatively large number of items or a large quantity of molded parts or materials of the invention.

It is immediately illuminating that at high pyrolysis temperatures, the fillers, to compensate for what here are now only very low polymer CTEs (for instance in the case of polysiloxanes), should have higher coefficients of expansion than steel or gray cast iron (here in particular silicates or $CaF_2$, in particular as mentioned above, which can be used alone or together with other filler materials, or MgO can be considered), while at low pyrolysis temperatures (where the polymer ceramic still has a high CTE), the fillers for compensating for the CTE in the direction of that of gray cast iron or steel must have a low CTE (this applies for instance to silicon nitride or silicon carbide).

The preferred temperatures for the pyrolysis (actually partial pyrolysis) are in the range from 200 to 800° C., in particular 400 to 750° C., preferably 500 to 750° C., above all between and including 500 and 680° C.

As fillers, granular fillers are preferably used whose preferred particle size is in the range from 1 to 50 $\mu$m.

Still other additives are possible. If needed, these components must also be taken into account in steps (A), (B) and/or (C) or A*, B* and/or C*, for instance creating multidimensional matrices in (B) or B*, or else they are simply kept constant, while only the filler proportion is varied (see FIG. 3).

The invention also relates to molded parts comprising the above-named and in particular the preferred starting materials; composite constructions which include one or more components (in particular molded parts) comprising a polymer ceramic of the invention as well as one or more components comprising other materials, in particular metal, above all steel or gray cast iron; the production methods, in particular preferred ones, mentioned above for the products, in particular the polymer ceramic materials, of the invention; a method, particularly as described above, for theoretical or preferably empirical ascertainment of the pyrolysis temperature and of the ratio of polymer to ceramic filler, and optionally of the proportion of further additives and/or further parameters, such as the particle size of the ceramic filler used, in order to obtain a polymer ceramic material or a molded part in accordance with the invention; the use of a product of the invention, in particular of a polymer ceramic material or above all a molded part, in machines, appliances or systems in which they come into contact (in particular solid or loose contact, for instance sliding contact) with metal materials or parts, in particular at temperatures in the range from room temperature to 400° C., such as 25 to 300° C., and preferably 50 to 300° C.; as well as corresponding machines, appliances or systems.

Quite particularly, the invention pertains to methods, materials and molded parts in accordance with the examples.

EXAMPLES

The following examples will serve to illustrate the invention, but without limiting it.

Exemplary Embodiment 1

For producing a solid cylinder measuring 1.5×4 cm, which is meant to serve as a spacer, the solid polymethylsilicone resin NH 2100 (Chemische Werke Nünchritz) and a mixture of $Al_2O_3$ (mean particle size <3 $\mu$m; CTE $8.3 \times 10^{-6}$ $K^{-1}$) and $SiO_2$ (mean particle size 11 $\mu$m, Sikron SH 300, Quarzwerke Frechen, CTE $14 \times 10^{-6} K^{-1}$) in a volumetric ratio of 50 volume percent polysiloxane resin, 40 volume percent $Al_2O_3$ and 10 volume percent $SiO_2$, in a grinding pot of 2000 ml capacity, which is filled with 0.6 particle size of ceramic grinding beads, is mixed dry for 12 hours at a rotary speed of 30 rpm. The mixed product is converted, while being stirred constantly, in a heatable agitator vessel at 140° C. (melting point of NH 2100, approximately 50° C.) into a low-viscosity suspension. As an aid in plasticizing, 3.5 mass % of wax is added (composition in mass %: 3.45 mass % wax, 28.85 mass % NH 2100, and 67.7 mass % filler).

With a low-pressure injection molding system, the cylinders are produced at 150° C. at a pressure of 5 MPa, in a steel cylinder injection molding tool preheated to 180° C. and with an outer diameter of 25 mm. After curing while the pressure is maintained, the mold is removed removed and stored in a heating cabinet for complete cross-linking at 260° C. for 12 hours. After the unmolding, the molded part is subjected to a heat treatment in an argon atmosphere. With heating to 580° C. at a heating rate of 2° C. per minute at a holding time of 4 hours, passive cooling then follows.

The cylinders produced in this way have a bending strength of 50 MPa and compared to the dimensions of the hot-pressed base body have a mean longitudinal shrinkage lengthwise of <1%. The linear thermal expansion in the temperature range from room temperature to 500° C. is $13.6 \times 10^{-6} K^{-1}$.

Exemplary Embodiment 2

For producing a molded part of a compressor, 73.8 mass % (equivalent to 47.5 volume percent) of $Al_2O_3$ (mean particle size <15 $\mu$m; CTE=$8.3 \times 10^{-6} K^{-1}$), 4.6 mass % of MgO (equivalent to 3.3 volume percent; CTE=$14 \times 10^{-6} K^{-1}$)

(mean particle size <10 μm), 21.2 mass % (equivalent to 49.2 volume percent) of silicone resin (NH 2100) and 0.4 mass % of aluminum acetylacetonate as a catalyst are mixed, as in exemplary embodiment 1. 520 g of the sieved (160 μm mesh width) powder are placed in a preheated, graphite-coated steel pressing mold. In a heatable hydraulic press, the hot pressing is done with a movable upper die with a constant pressure of 10 MPa, while conversely the temperature is raised in 10° C. increments, after a holding time of 30 minutes each, from 80° to finally 130° C. The pressing composition is held at this temperature for 24 hours, in order to assure its curing.

After the unmolding, internal bores are made by machining on a lathe. This is followed by the heat treatment in a graphite-heated resistance furnace in an argon atmosphere, with the green body supported on a porous $Al_2O_3$ substrate. At a constant heating rate of 2° C. per minute, heating is done to 580° C., and the material is held for 5 hours at this temperature. The cooling is again done at a constant cooling rate of 2° C. per minute.

The linear thermal expansion of the shaped body obtained, in the temperature range from room temperature to 500° C., is $11.3 \times 10^{-6} K^{-1}$. The shaped body has high dimensional accuracy: Compared to the initial length of 115.25 mm (perpendicular to the pressing direction) of the cured shaped body, a shrinkage of <50 μm is found, which is equivalent to a linear change in dimension of <0.05%. For installation, the shaped body can therefore be used directly, without further surface machining. The bending strength $\sigma_B$ is 51 $N/mm^2$, and the material remains stable up to a temperature of 405° C.

Exemplary Embodiment 3:

To ascertain the thermal expansion behavior, small sample rods with a rectangular cross section of 5×5 $mm^2$ and a length of 38 mm are produced by hot pressing in accordance with exemplary embodiment 2. The compositions of the small sample rods, examined in a dilatometer, are shown in Table 2:

TABLE 2

Sample Compositions for Investigating the Thermal Expansion at Approximately Zero Shrinkage. The figures are given in mass %

| Sample | *No NH2100 | *$Al_2O_3$ | *SiC | *$SiO_2$ | *MgO | *$ZrO_2$ | Al(acac)$_2$ | Tpyr (° C.) | CTE ($10^{-6}K^{-1}$) |
|---|---|---|---|---|---|---|---|---|---|
| 1 | 21.61 | 76 | — | — | — | — | 0.39 | 661 | 11.3 |
| 2 | 25.3 | — | 74.1 | — | — | — | 0.6 | 650 | 9.85 |
| 3 | 22.78 | 65.75 | — | 10.98 | — | — | 0.39 | 580 | 13.6 |
| 4 | 22.65 | 32.7 | — | — | 44.23 | — | 0.42 | 570 | 15.7 |
| 5 | 17.62 | 25.44 | — | — | — | 56.62 | 0.32 | 671 | 15.3 |

CTE = linear thermal expansion;
T$_{pyr}$ = pyrolysis temperature
*quantity in mass proportions (or g)

In a differential dilatometer (Netzsch Gerätebau), the small sample rods are measured in comparison to an $Al_2O_3$ standard in the temperature range from room temperature to 500° C. The heating rate is 5° C. per minute. As Table 2 shows, it is possible, by heat treatment in the temperature range from 570 to 671° C., to adapt the thermal expansion of the samples investigated quite well to the values of ferritic steels (10 to $14 \times 10^{-6} K^{-1}$) or gray cast iron (9 to $11 \times 10^{-6} K^{-1}$). The shrinkage is less than 0.1%.

What is claimed is:

1. A molded part or a composite construction including said molded part and one or more parts of other materials, said molded part comprising a polymer ceramic material, and wherein said molded part is obtained by a method comprising the steps of:
   mixing together and mold-shaping at least one polymer and one or more ceramic fillers selected from the group consisting of $Al_2O_3$, MgO, cubic or partially stabilized $ZrO_2$, $CeO_2$, $CaTiO_3$, C, $CaF_2$, SiC, $Cr_3C_2$, $Fe_2TiO_5$, $MgFe_3O_4$, phosphate glasses, $Si_3N_4$, and $TiO_2$;
   subjecting the mixture to cross-linking, resulting in a precursor stage of the molded part;
   and subjecting said precursor stage of the molded part to a partial pyrolysis;
   where, in the case of a composite construction, said method further comprises a step of incorporating one or more parts of other materials before the crosslinking and/or after the partial pyrolysis;
   wherein the polymer and the ceramic filler are provided in weight ratios, said ratios and said partial pyrolysis are selected on the basis of theoretically or empirically ascertained values, such that the resultant molded part has a thermal expansion behavior comparable to that of a metal, and after the partial pyrolysis has the same linear dimensions as the precursor stage of the molded part prior to partial pyrolysis, with a tolerance of equal to or less than 0.1%.

2. The molded part or composite construction of claim 1, wherein the ceramic filler is provided in a proportion of 10 to 80 volume percent of the molded part, the polymer is provided in a proportion of 20 to 90 volume percent of the molded part, and the partial pyrolysis is performed in a temperature range between 200 and 800° C., resulting in a shrinkage of 0.1% or less.

3. The molded part or composite construction according to claim 2, wherein the temperature of the partial pyrolysis is selected within the range of 500 to 750° C., resulting in a shrinkage of 0.05% or less.

4. The molded part or composite construction of claim 1, wherein the molded part further comprises other additives in a proportion of up to 10 volume percent of the molded part.

5. The molded part or composite construction of claim 1, wherein the thermal expansion of the molded part is the same as that of steel or gray cast iron.

6. The molded part or composite construction of claim 1, wherein the thermal expansion of the molded part is in the range from −50° C. to 500° C. and is the same as that of steel or gray cast iron.

7. The molded part or composite construction of claim 1, wherein the thermal expansion of the molded part is in the range from room temperature to 400° C. and is the same as that of steel or gray cast iron.

8. The molded part or composite construction of claim 1, wherein said ceramic fillers have a particle size of from 1 to 50 µm.

9. The composite construction of claim 1, wherein said one or more parts of other materials are metal parts.

10. The composite construction of claim 9, wherein said metal parts are steel or gray cast iron parts.

11. A method of making the molded part or the composite construction of claim 1 comprising the steps of:

mixing together and mold-shaping at least one polymer and one or more ceramic fillers selected from the group consisting of $Al_2O_3$, MgO, cubic or partially stabilized $ZrO_2$, CeO2, $CaTiO_3$, C, $CaF_2$, SiC, $Cr_2C_2$, $Fe_2TiO_5$, $MgFe_3O_4$, phosphate glasses, $Si_3N_4$, and $TiO_2$;

subjecting the mixture to cross-linking, resulting in a precursor stage of the molded part;

and subjecting said precursor stage of the molded part to a partial pyrolysis;

wherein in the case of a composite construction, said method further comprises the step of incorporating one or more parts of other materials before the crosslinking and/or after the partial pyrolysis;

wherein the polymer and the ceramic filler are provided in weight ratios, said ratios and said partial pyrolysis are selected on the basis of theoretically or empirically ascertained values, such that the resultant molded part has a thermal expansion behavior comparable to that of a metal, and after the partial pyrolysis has the same linear dimensions as the precursor stage of the molded part prior to partial pyrolysis, with a tolerance of equal to or less than 0.1%.

12. The method of claim 11, wherein said polymer and ceramic filler ratios and said partial pyrolysis are selected such that the resultant molded part has a thermal expansion behavior comparable to that of steel or gray cast iron, and after the partial pyrolysis has the same linear dimensions as the precursor stage of the molded part prior to partial pyrolysis, with a tolerance of equal to or less than 0.05%.

13. The method of claim 11, wherein selection of the polymer and ceramic filler weight ratios and selection of the partial pyrolysis temperature comprises the following steps:

(A) empirically ascertaining the partial pyrolysis temperature for zero shrinkage of a molded part, and ascertaining the coefficient of thermal expansion of said molded part; wherein said molded part is produced from a polymer or a polymer ceramic material;

(B) modifying the coefficient of thermal expansion by admixing ceramic fillers (in which further variables should be initially kept constant) to achieve a coefficient of thermal expansion comparable to that of steel or gray cast iron; and (C) ascertaining the exact pyrolysis temperature for zero shrinkage and simultaneously adjusting the coefficient of thermal expansion, wherein zero shrinkage is defined by no change in the linear dimensions of the molded part after undergoing partial pyrolysis, with a tolerance of equal to or less than 0.1%;

wherein step (B) is repeated once again with fine tuning if the ascertained pyrolysis temperature is between raster points used; and furthermore, single or multiple repetition of step (B) and/or (C) may be required in an iterative fashion, in order to establish the exact pyrolysis temperature and weight ratios.

14. The method of claim 11, wherein selection of the polymer and ceramic filler weight ratios and selection of the partial pyrolysis temperature comprises the following steps:

(A*) ascertaining the coefficient of thermal expansion of a molded part by performing pyrolysis of a molded part and ascertaining the resultant shrinkage or expansion of said molded part; wherein said molded part is produced from a polymer or a polymer ceramic material;

(B*) modifying the coefficient of thermal expansion by admixing ceramic fillers to achieve a coefficient of thermal expansion comparable to that of steel or gray cast iron; and (C*) ascertaining the pyrolysis temperature for zero shrinkage, wherein zero shrinkage is defined by no change in the linear dimensions of the molded part after undergoing partial pyrolysis, with a tolerance of equal to or less than 0.1%;

furthermore, single or multiple repetition of step (B*) and/or (C*) may be required in an iterative fashion, in order to establish the exact pyrolysis temperature and weight ratios.

* * * * *